US012228033B1

(12) United States Patent
Micucci et al.

(10) Patent No.: US 12,228,033 B1
(45) Date of Patent: Feb. 18, 2025

(54) BLADE OUTER AIR SEAL WITH MACHINABLE COATING AT SEALING SURFACES

(71) Applicant: RTX CORPORATION, Farmington, CT (US)

(72) Inventors: Joseph Micucci, Scarborough, ME (US); Daniel S. Rogers, Lyman, ME (US); Mikayla M. Rogers, Portland, ME (US); Danielle Mahoney, Granby, CT (US); Carson A. Roy Thill, Buxton, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/486,793

(22) Filed: Oct. 13, 2023

(51) Int. Cl.

| | |
|---|---|
| ***F01D 11/08*** | (2006.01) |
| ***F01D 11/00*** | (2006.01) |
| ***F01D 25/00*** | (2006.01) |
| ***F01D 25/28*** | (2006.01) |

(52) U.S. Cl.
CPC ............ *F01D 11/08* (2013.01); *F01D 11/005* (2013.01); *F01D 25/005* (2013.01); *F01D 25/28* (2013.01); *F05D 2230/90* (2013.01); *F05D 2260/38* (2013.01); *F05D 2300/6033* (2013.01)

(58) Field of Classification Search
CPC ........ F01D 11/005; F01D 11/08; F01D 11/12; F01D 11/122; F01D 11/27; F01D 11/18; F01D 25/005; F01D 25/28; F05D 2230/90; F05D 2240/11; F05D 2260/38; F05D 2300/6033
See application file for complete search history.

(56) References Cited

U.S. PATENT DOCUMENTS

| | | | | |
|---|---|---|---|---|
| 11,466,585 | B2 | 10/2022 | Arbona et al. | |
| 11,519,283 | B2 | 12/2022 | Roy Thill et al. | |
| 2018/0311934 | A1 | 11/2018 | Shoemaker et al. | |
| 2021/0156311 | A1* | 5/2021 | Lutjen | F01D 11/005 |
| 2021/0254488 | A1* | 8/2021 | Roy Thill | F01D 11/08 |
| 2021/0254503 | A1* | 8/2021 | Roy Thill | F01D 11/08 |

* cited by examiner

*Primary Examiner* — Christopher Verdier
(74) *Attorney, Agent, or Firm* — Carlson, Gaskey & Olds, P.C.

(57) ABSTRACT

A gas turbine engine includes a compressor section, a combustor section and a turbine section for rotation on an axis. The turbine section includes at least one row of rotating turbine blades each having a radially outer tip. A blade outer air seal is positioned radially outwardly of the radially outer tip. The blade outer air seal has a central web positioned radially outwardly of the radially outer tip. The blade outer air seal has an upstream mount arm and a downstream mount arm receiving mount structure from a static structure. The static structure has sealing members engaging an upstream outer surface of the upstream mount arm at an upstream seal material and a downstream outer surface of the downstream mount arm at a downstream seal material. A method is also disclosed.

18 Claims, 3 Drawing Sheets

BLADE OUTER AIR SEAL WITH MACHINABLE COATING AT SEALING SURFACES

BACKGROUND OF THE INVENTION

This application relates to the use of machinable coatings to provide sealing surfaces on a blade outer air seal.

Gas turbine engines typically include a fan delivering air into a bypass duct as propulsion air, and into a core engine. The core engine air moves into a compressor section where it is compressed and delivered into a combustor. The air is mixed with fuel and ignited in the combustor and passed downstream over turbine rotors driving them to rotate. The turbine rotors in turn rotate the fan and compressor rotors.

Improving the efficiency of gas turbine engines is important. To maximize the volume of the products of combustion passing over the turbine rotors, a blade outer air seal ("BOAS") is placed radially outwardly of turbine blades to block the flow of products of combustion from avoiding the turbine blades.

It is known that components in the turbine section see very high temperatures. It has been proposed to utilize ceramic matrix composites ("CMCs") to form blade outer air seals. Additional seals are placed at upstream and downstream ends of the blade outer air seal to reduce leakage of air from a chamber radially outward of the blade outer air seal into the path of the products of combustion.

In one known arrangement, a coating is placed at upstream and downstream locations to provide a sealing location on the CMC BOAS.

SUMMARY OF THE INVENTION

In a featured embodiment, a gas turbine engine includes a compressor section, a combustor section and a turbine section for rotation on an axis. The turbine section includes at least one row of rotating turbine blades each having a radially outer tip. A blade outer air seal is positioned radially outwardly of the radially outer tip. The blade outer air seal is formed of ceramic matrix composite materials. The blade outer air seal has a central web positioned radially outwardly of the radially outer tip. The blade outer air seal has an upstream mount arm and a downstream mount arm receiving mount structure from a static structure. The static structure has sealing members engaging an upstream outer surface of the upstream mount arm at an upstream seal material and a downstream outer surface of the downstream mount arm at a downstream seal material. At least one of the upstream seal material and the downstream seal material is formed of a bond layer deposited on the mount arm, and a seal layer is deposited on the bond layer. A seal thickness in an axial direction is defined for the combination of the bond layer and the seal layer at a contact location with a respective one of the sealing members. A mount arm width of a respective one of the upstream mount arm and downstream mount arm is associated with the at least one of the upstream seal material and downstream seal material has a width at a radial location of the contact location and a ratio of the seal thickness to the mount arm width is greater than or equal to 0.4 and less than or equal to 0.8.

In another embodiment according to the previous embodiment, the bond layer and seal layer are formed at both the upstream seal material and the downstream seal material.

In another embodiment according to any of the previous embodiments, the bond layer is formed of silicone.

In another embodiment according to any of the previous embodiments, the seal layer is formed of one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

In another embodiment according to any of the previous embodiments, the seal layer is formed of mullite.

In another embodiment according to any of the previous embodiments, the sealing member contacting the upstream seal material has a spring bias away from the static structure.

In another embodiment according to any of the previous embodiments, the upstream seal material and downstream seal material are formed in part on the respective ones of the upstream and downstream mount arms, and also extending to a radially outer side of the central web.

In another embodiment according to any of the previous embodiments, the upstream seal material and downstream seal material are formed in part on the respective ones of the upstream and downstream mount arms, and also extending to a radially outer side of the central web.

In another embodiment according to any of the previous embodiments, an axial thickness of the bond layer in each the upstream seal material and downstream seal material is less than an axial thickness of the seal layer.

In another embodiment according to any of the previous embodiments, the seal layer is formed of mullite.

In another embodiment according to any of the previous embodiments, the sealing member contacting the upstream seal material has a spring bias away from the static structure.

In another embodiment according to any of the previous embodiments, the upstream seal material and downstream seal material are formed in part on the respective ones of the upstream and downstream mount arms, and also extending to a radially outer side of the central web.

In another embodiment according to any of the previous embodiments, an axial thickness of the bond layer on the at least one of the upstream seal material and downstream seal material is less than an axial thickness of the seal layer.

In another embodiment according to any of the previous embodiments, an axial thickness of the bond layer on the at least one of the upstream seal material and downstream seal material is less than an axial thickness of the seal layer.

In another embodiment according to any of the previous embodiments, the sealing member contacting the upstream seal material has a spring bias away from the static structure.

In another embodiment according to any of the previous embodiments, the upstream seal material and downstream seal material are formed in part on the respective ones of the upstream and downstream mount arms, and also extending to a radially outer side of the central web.

In another embodiment according to any of the previous embodiments, the upstream seal material and downstream seal material are formed in part on the respective ones of the upstream and downstream mount arms, and also extending to a radially outer side of the central web.

In another embodiment according to any of the previous embodiments, an axial thickness of the bond layer on the at least one of the upstream seal material and downstream seal material being less than an axial thickness of the seal layer.

In another featured embodiment, a method of forming a blade outer air seal includes the steps of 1) forming a blade outer air seal body to have a web and two mount arms extending away from the web of ceramic matrix composite material, the mount arms each defining an inner facing surface and an outer surface, 2) depositing a bond layer on the outer surface of each of the mount arms, 3) depositing a seal layer on the bond layer, the seal layer being formed to extend away from the bond layer for an initial thickness and 4) machining away the seal layer to a second thickness, smaller than the initial thickness and wherein a ratio of the second thickness to a thickness of the mount arm is greater than or equal to 0.4 and less than or equal to 0.8.

In another embodiment according to any of the previous embodiments, the central web curves about a circumference centered on a central axis, and the seal layer on both of the upstream mount arm and downstream mount arm extends for an axial thickness that is greater than the axial thickness of the bond layer.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
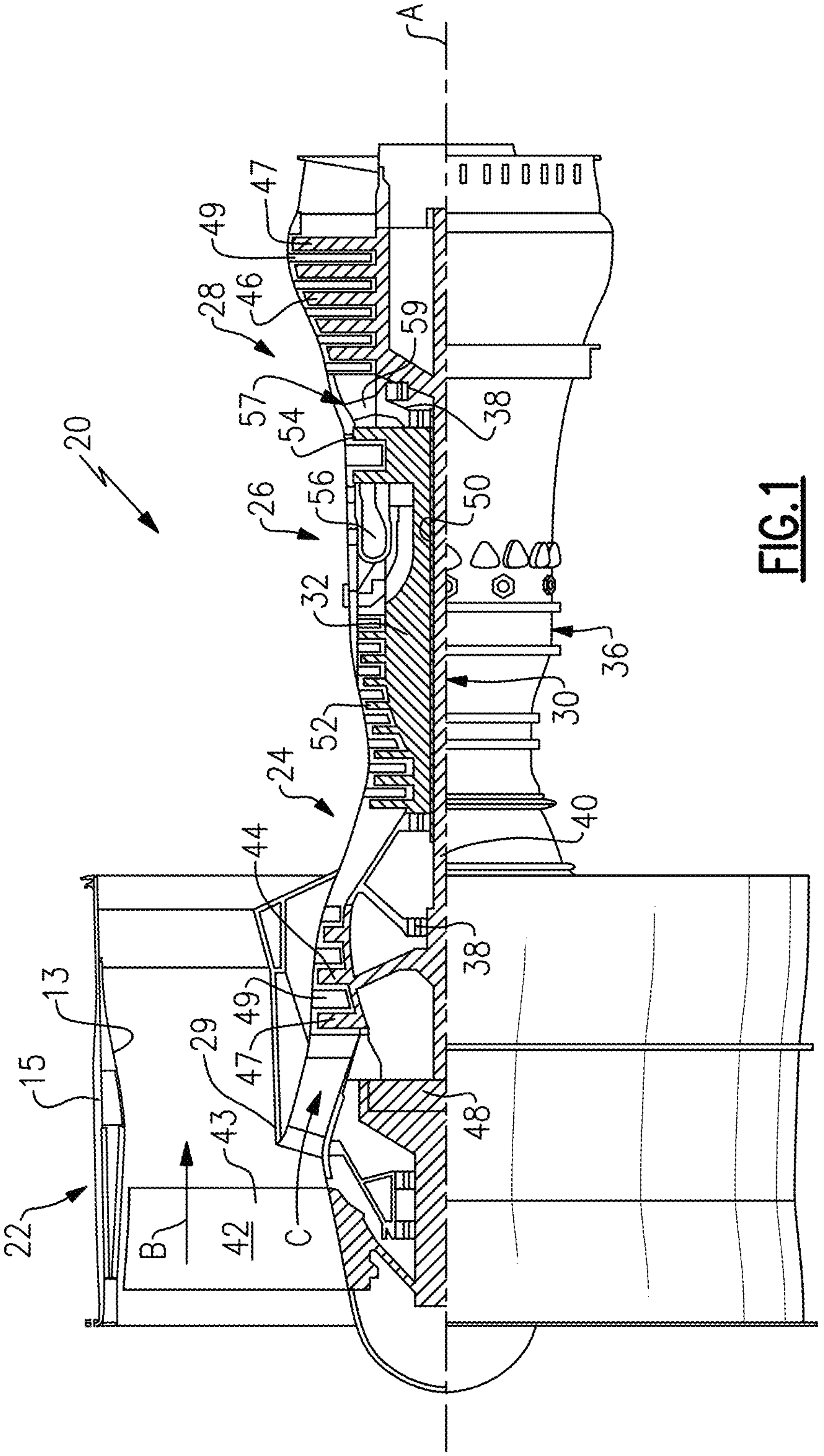
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } °\text{R})/(518.7°\text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
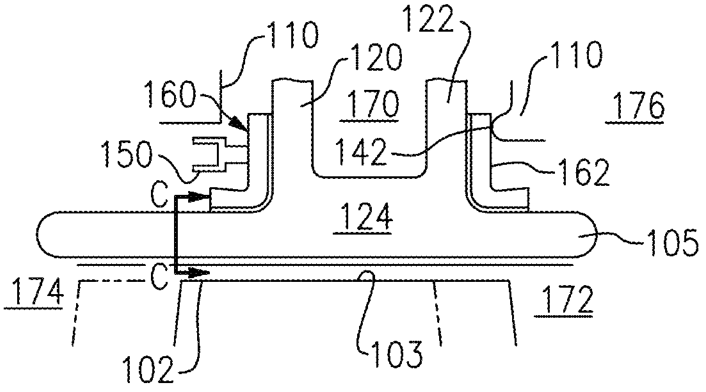
FIG. 2A shows a turbine section.

FIG. 2A shows a turbine section 28 having rotating turbine blades 102 with a radially outer tip 103. A vane is positioned upstream of the turbine blade 102. A blade outer air seal 105 is positioned radially outwardly of the tip 103. The blade outer air seal 105 is mounted to static structure 110 by mount arms 120 and 122.

The blade outer air seal 105 has a central web 124 forming a radially inward facing surface.

Mount arm 120 has seal material 160 providing a contact location for a W-seal 150. W-seal 150 has a spring member biasing a seal tip into contact with seal material 160. The spring reacts off a static surface to provide the bias force. Seal material 160 includes a bond layer. The seal layer is more than twice as thick in an axial direction as the bond layer on the portion of the seal material 160 secured to the mount arm 120.

The mount structure 110 has a contact point 142 contacting a rear seal material 162 on mount arm 122. Rear seal material 162 also has a bond layer 162B and a seal layer 162S. As shown, the seal layer 162S is more than twice as thick as the bond layer 162B along a portion secured to the mount arm 122.

Thus, both seal materials 160 and 162 have bond layers on an outer surface of mount arms 120 and 122. The bond layers extend along a rear surface of web 124.

The sealing contact at seals 160 and 162 separate a radially outer high pressure chamber 176 from radially inner chambers 174 and 172.

The blade outer air seal 105 is formed out of ceramic matrix composite materials ("CMCs") are formed of CMC material or a monolithic ceramic. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

The material forming the bond layers is distinct from the material forming the seal layers. In one embodiment the bond layers may be plasma sprayed silicone.

In further embodiments the materials forming the seal layers may be a machinable coating. The coating may include include rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof. In a particular example, the coating includes at least one of hafnon, zircon, and mullite.

In one embodiment the seal layers are formed of mullite.

Figure 2B:
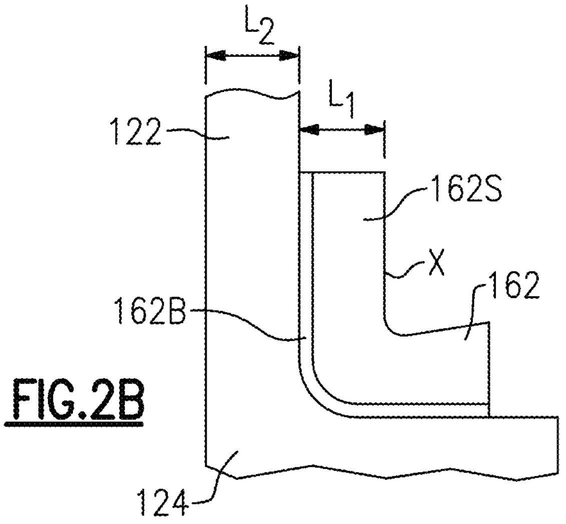
FIG. 2B shows a portion of a blade outer air seal from the FIG. 2A turbine section.

FIG. 2B shows a detail of the seal material 162. Although the feature is illustrated with regard to seal material 162, the relationships would also be true of the seal material 160 on the mount arm 120. Seal material 162 extends for a thickness $L_1$ away from a surface of the mount arm 122. The mount arm 122 has a thickness $L_2$ at the area to which the seal material 162 is secured. In particular, $L_2$ may be measured at a contact point X with surface 142, or the W-seal 150. A ratio of $L_1$ to $L_2$ may be greater than or equal to 0.4 and less than or equal to 0.8.

Figure 2C:
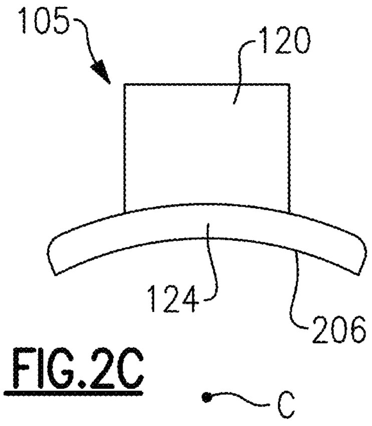
FIG. 2C is a cross-sectional view along line C-C of FIG. 2A.

FIG. 2C shows a view along lines C-C of FIG. 2A. As can be seen, the blade outer air seal 105 has its central web 124 with a curved inner surface 206 which is part cylindrical, and centered on a center axis C. When this application uses the term "axial" it should be understood to mean along rotational axis A (FIG. 1) or center axis C.

Figure 3:
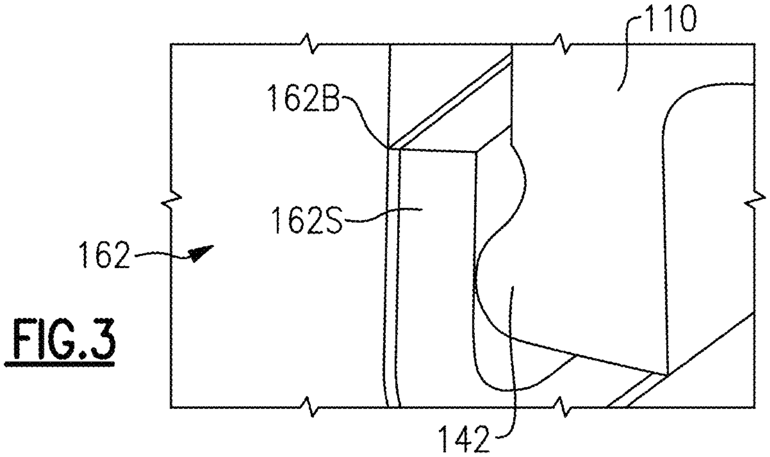
FIG. 3 is a perspective view of a sealing location on the blade outer air seal.

FIG. 3 shows a contact surface 142 of the mount structure 110 contacting the seal portion 162S of the seal 160.

A method of forming the seal materials 160 and 162 is illustrated with regard to FIGS. 4A-4D.

Figure 4A:
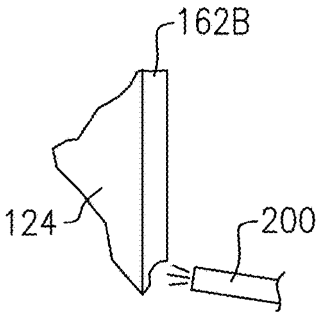
FIG. 4A illustrates a first method step in forming the blade outer air sealing surfaces.

As shown in FIG. 4A, the blade outer air seal 105 has the plasma spray silicone forming the bond layer 162B. Spray machine 200 is schematically shown depositing the material. Once deposited, the bond layer 162B may be machined, although that is optional.

Figure 4B:
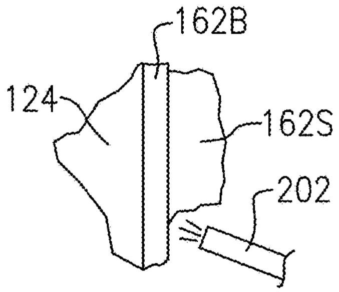
FIG. 4B shows a subsequent step.

As shown in FIG. 4B, after the FIG. 4A step, the seal layer 162S is deposited by a spray machine 202 on the bond layer 162B.

Figure 4D:
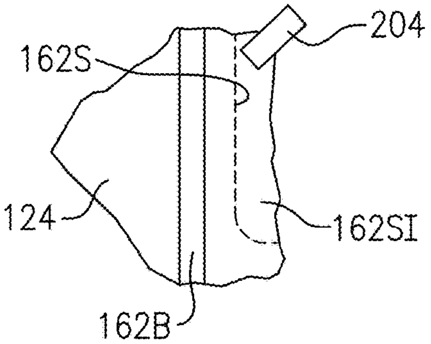
FIG. 4D shows a machining step.
Figure 4C:
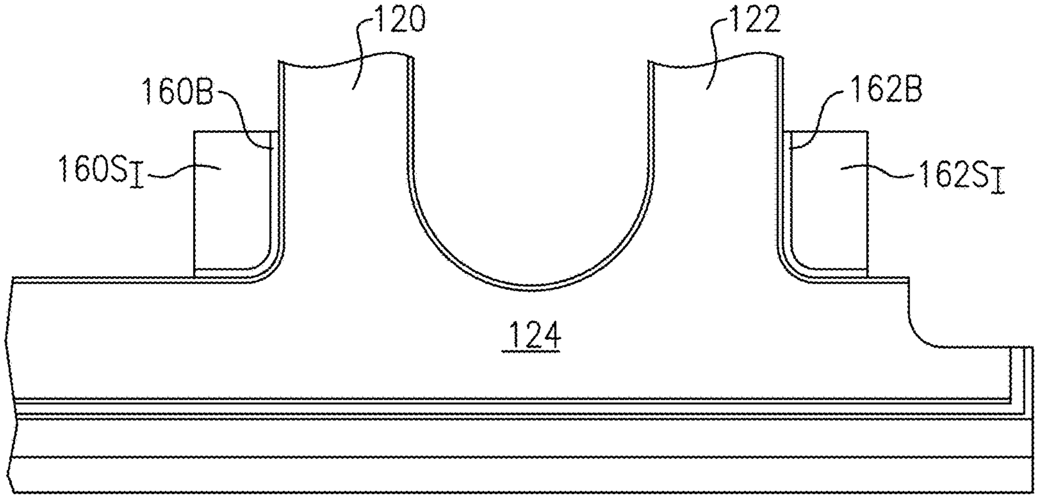
FIG. 4C shows an intermediate product for forming the sealing surfaces.

Steps 4A and 4B form an intermediate seal for both locations 160 and 162 as shown in FIG. 4C. The intermediate seal layers 162$S_I$ and 160$S_I$ are much thicker than shown in, say, FIGS. 2A and 2B. Further, the seal layers as shown in FIGS. 2A and 2B generally have a J or L shape. This does not exist with the intermediate layers 162$S_I$ and 160$S_I$.

Thus, as shown in FIG. 4D, from the intermediate product shown in FIG. 4C, a tool 204 is machining away the material from the deposited coating 162$S_I$, cutting it down to the final shape 162S.

In the prior art mentioned in the Background of the Invention section, there is a single layer, and it is thinner.

The machinable coating provides a much more reliable sealing surface than the outer surface of the CMC material. The bond layer provides a good bond to the CMC material, and the machinable coating layers provide very accurate control over the dimensions, and a good sealing surface.

A gas turbine engine under this disclosure could be said to include a compressor section, a combustor section and a turbine section for rotation on an axis. The turbine section includes at least one row of rotating turbine blades each having a radially outer tip. A blade outer air seal is positioned radially outwardly of the radially outer tip. The blade outer air seal is formed of ceramic matrix composite materials and has a central web positioned radially outwardly of the radially outer tip. The blade outer air seal has an upstream mount arm and a downstream mount arm receiving mount structure from a static structure. The static structure has sealing members engaging an upstream outer surface of the upstream mount arm at an upstream seal material and a downstream outer surface of the downstream mount arm at a downstream seal material. At least one of the upstream seal material and the downstream seal material are formed of a bond layer deposited on the mount arm, and a seal layer deposited on the bond layer. A seal thickness in an axial direction is defined for the combination of the bond layer and the seal layer at a contact location with a respective one of the sealing members. A mount arm width of a respective one of the upstream mount arm and downstream mount arm associated with the at least one of the upstream seal material and downstream seal material has a width at a radial location of the contact location and a ratio of the seal thickness to the mount arm width is greater than or equal to 0.4 and less than or equal to 0.8.

A method of forming a blade outer air seal under this disclosure could be said to include the steps of 1) forming a blade outer air seal body to have a web and two mount arms extending away from the web of ceramic matrix composite material, the mount arms each defining an inner facing surface and an outer surface, 2) depositing a bond layer on the outer surface of each of the mount arms, 3) depositing a seal layer on the bond layer, the seal layer being formed to extend away from the bond layer for an initial thickness and 4) machining away the seal layer to a second thickness, smaller than the initial thickness and wherein a ratio of the second thickness to a thickness of the mount arm is greater than or equal to 0.4 and less than or equal to 0.8.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising:

a compressor section;

a combustor section; and a turbine section for rotation on an axis, the turbine section including at least one row of rotating turbine blades each having a radially outer tip; and a blade outer air seal positioned radially outwardly of the radially outer tip, the blade outer air seal formed of ceramic matrix composite materials, the blade outer air seal having a central web positioned radially outwardly of the radially outer tip;

the blade outer air seal having an upstream mount arm and a downstream mount arm mounted to a static structure, the static structure having respective sealing members each engaging a respective upstream outer surface of the upstream mount arm at an upstream seal material and a respective downstream outer surface of the downstream mount arm at a downstream seal material, at least one of the upstream seal material and the downstream seal material being formed of a bond layer deposited on the mount arm, and a seal layer deposited on the bond layer;

a seal thickness in an axial direction defined for the combination of the bond layer and the seal layer at a contact location with a respective one of the sealing members; and a mount arm width of a respective one of the upstream mount arm and downstream mount arm associated with the at least one of the upstream seal material and downstream seal material has a width at a radial location of the contact location and a ratio of the seal thickness to the mount arm width is greater than or equal to 0.4 and less than or equal to 0.8.

2. The gas turbine engine set forth in claim 1, wherein said bond layer and seal layer are formed at both the upstream seal material and the downstream seal material.

3. The gas turbine engine as set forth in claim 2, wherein the bond layer is formed of silicone.

4. The gas turbine engine as set forth in claim 3, wherein the seal layer is formed of one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides including hafnon, hafnium silicon oxides, alumina-stabilized zirconia, zirconium oxides including zircon, yttrium oxides including yttria, mullite, and combinations thereof.

5. The gas turbine engine as set forth in claim 4, wherein the seal layer is formed of mullite.

6. The gas turbine engine as set forth in claim 5, wherein the sealing member contacting the upstream seal material has a spring bias away from the static structure.

7. The gas turbine engine as set forth in claim 6, wherein the upstream seal material and downstream seal material are formed in part on said respective ones of the upstream and downstream mount arms, and also extending to a radially outer side of the central web.

8. The gas turbine engine as set forth in claim 5, wherein the upstream seal material and downstream seal material are formed in part on said respective ones of the upstream and downstream mount arms, and also extending to a radially outer side of the central web.

9. The gas turbine engine as set forth in claim 8, wherein an axial thickness of the bond layer in each of the upstream seal material and downstream seal material being less than an axial thickness of the seal layer.

10. The gas turbine engine as set forth in claim 1, wherein the seal layer is formed of mullite.

11. The gas turbine engine as set forth in claim 10, wherein the sealing member contacting the upstream seal material has a spring bias away from the static structure.

12. The gas turbine engine as set forth in claim 11, wherein the upstream seal material and downstream seal material are formed in part on said respective ones of the upstream and downstream mount arms, and also extending to a radially outer side of the central web.

13. The gas turbine engine as set forth in claim 12, wherein an axial thickness of the bond layer on the at least one of the upstream seal material and downstream seal material being less than an axial thickness of the seal layer.

14. The gas turbine engine as set forth in claim 10, wherein an axial thickness of the bond layer on the at least one of the upstream seal material and downstream seal material being less than an axial thickness of the seal layer.

15. The gas turbine engine as set forth in claim 1, wherein the sealing member contacting the upstream seal material has a spring bias away from the static structure.

16. The gas turbine engine as set forth in claim 15, wherein the upstream seal material and downstream seal material are formed in part on said respective ones of the upstream and downstream mount arms, and also extending to a radially outer side of the central web.

17. The gas turbine engine as set forth in claim 1, wherein the upstream seal material and downstream seal material are formed in part on said respective ones of the upstream and downstream mount arms, and also extending to a radially outer side of the central web.

18. The gas turbine engine as set forth in claim 1, wherein an axial thickness of the bond layer on the at least one of the upstream seal material and downstream seal material being less than an axial thickness of the seal layer.

* * * * *